(12) United States Patent
Hou et al.

(10) Patent No.: US 6,581,127 B1
(45) Date of Patent: Jun. 17, 2003

(54) FRAMEWORK AND METHOD FOR INTER-ELEMENT CHANNEL TRANSMISSION

(75) Inventors: Chien Tzu Hou, Taipei (TW); Hsiu Ying Hsu, Taipei (TW)

(73) Assignee: Geneticware Co., Ltd., Tortola (VG)

( * ) Notice: Subject to any disclaimer, the term of this patent is extended or adjusted under 35 U.S.C. 154(b) by 0 days.

(21) Appl. No.: 09/477,286

(22) Filed: Jan. 4, 2000

(51) Int. Cl.⁷ .......................... G06F 13/00; G06F 13/14
(52) U.S. Cl. ........................ 710/305; 710/100
(58) Field of Search ........................... 710/100, 305; 713/1, 2, 100; 709/208

(56) References Cited

U.S. PATENT DOCUMENTS

| | | | | |
|---|---|---|---|---|
| 5,590,316 A | * | 12/1996 | Hausauer | 713/501 |
| 5,638,016 A | * | 6/1997 | Eitrheim | 327/175 |
| 5,918,027 A | * | 6/1999 | Osakabe | 710/305 |
| 6,032,178 A | * | 2/2000 | Bacigalupo et al. | 709/208 |
| 6,127,861 A | * | 10/2000 | Lee | 327/112 |
| 6,163,851 A | * | 12/2000 | Yamazoe et al. | 713/600 |
| 6,346,828 B1 | * | 2/2002 | Rosen et al. | 326/56 |

* cited by examiner

Primary Examiner—Xuan M. Thai
Assistant Examiner—Tim Vo
(74) Attorney, Agent, or Firm—Rosenberg, Klein & Lee

(57) ABSTRACT

A framework and a respective method for inter-element channel transmission are introduced mainly by constructing a plurality of connecting channels between elements. Each channel further includes a plurality of signal lines. Implicit meaning (data, address or control signal) in the signal line is realized by judging the variation of duty cycle in a clock signal, or an A/C line is used to define the transmission of a start signature, an end signature, address signals and control signals. By providing the transmission models of the present invention, each channel can operate independently, perform unidirectional transmission of address and data signals, and adjust the channel arrangement in accordance with practical requirements. Thereby, the signal transmission between elements can be highly mobile, the idle transmission time between elements can be greatly reduced, and the optimal transmission efficiency can be achieved.

2 Claims, 5 Drawing Sheets

FRAMEWORK AND METHOD FOR INTER-ELEMENT CHANNEL TRANSMISSION

BACKGROUND OF THE INVENTION (1) Field of the Invention

The invention relates to a framework for inter-element channel transmission and a method for the same, and more particularly to a channel transmission model and a respective methodology design, which are suitable to be operated independently and whose channel arrangement can be arbitrarily adjusted according to practical requirements.

(2) Description of the Prior Art

In a conventional framework of a computer system, various buses might be used to form a communication net among elements in the computer system. As shown in FIG. 1, a plurality of conventional buses are used to bridge a first element 10 and a second element 20, in which the first or the second elements 10 or 20 can be embodied as a CPU, a memory, a peripheral, or any the like. Generally, the bus can be classified into three categories as follows. They are:

1. A control bus for generating specific signals to control the system, mainly used to establish the communication between a CPU and a peripheral or between a CPU and a memory;

2. An address bus for determining the target address, a memory or an I/O device, of a specific signal; and 3. A data bus for single-direction or bi-direction data transmission, capable of data-reading and/or data-writing with respect to a CPU, a peripheral, or a memory.

By providing the control bus, signal flows in the computer can be predetermined. By providing the address bus, the signal can be led to the target device. Also, by providing the data bus, the read-out or the write-in data can be transmitted. However, these conventional buses have the following disadvantages.

1. Uniqueness: while a transmission job occupies a specific bus, all other jobs need to wait in queue orderly until the bus is released from the previous job. That is, the conventional bus can't send and receive data at the same time.

2. Most data lines used for data/address buses in a computer system are 64-bit-width data lines. However, it is expectable in the near future that a bus with 128-bit-width data lines will be the mainstream. Such an increase in the bit width implies the inevitable increase in the number of pin counts for the data line as well as the bus, and will result in the difficulty of package and in the increase of size. In particular, the system controller is mostly effected by the increase of the pin count, due to its connection to most important elements.

3. In a condition of simultaneous switching (from 0 to 1, or from 1 to 0 at the same time) at parallel data/address lines, higher consumed power is inevitable and thus larger noise will effect the transmission.

SUMMARY OF THE INVENTION

Accordingly, it is an object of the present invention to provide a framework and a corresponding method for inter-element channel transmission, in which various channels are used as the communication means between elements and so that data in the system can be reasonably allocated in accordance with practical requirements. In the present invention, each channel includes a plurality of signal lines for transmitting control, data and address signals according to a predetermined communication protocol.

In a preferred embodiment of the present invention, one of the signal lines in the channel can be used to transmit clock or start flag signals. According to the present invention, the clock signal can be an inconsistent square wave for determining the data formats transmitted in the data lines by judging the duty cycle in each wave cycle. By providing a duty cycle detector to detect the duty cycle, the implicit meaning of the signals transmitted in the respective signal lines can then be realized; that is, signal lines for transmitting address signals, data signals or control signals can thus be clearly defined.

Accordingly, in another preferred embodiment of the present invention, an A/C line (address/control line) of the channel can be used to define the start and the end of transmission and to transmit the address and the control signals. The rest signal lines in the same channel are then left as the data lines for transmitting data signals. By judging the variation of signals transmitted in the A/C line, latch sequences in the data lines can then be realized. On the other hand, by judging the variation in the data lines, bit difference of the address signals transmitted in the A/C line can be also read. In the present invention, by providing a data line switch detector and an edge and starting signature detector, characteristics of signals transmitted in the data lines and the A/C line can then be detected.

Upon aforesaid arrangement of the transmission model and the methodology, each channel of the present invention can operate as a complete bus, characterized in independent operation and unique-directional transmission for both address and data signals. Also, the channels in the present invention can be properly adjusted to meet practical requirements. Thereby, mobility of signal transmission among various elements can be achieved; so that the idle transmission time for each element can be greatly reduced and, consequently, optimal transmission efficiency can be obtained. By providing the channel framework of the present invention, much benefit can be obtained in constructing a complete hardware work.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a framework and a respective method for inter-element channel transmission. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
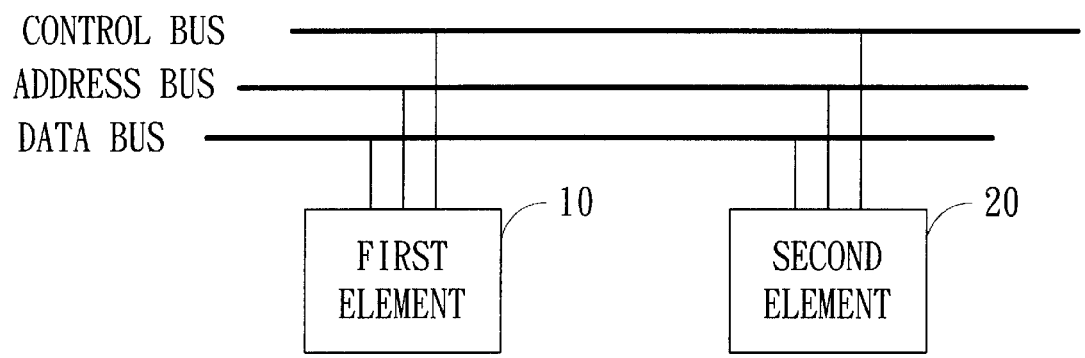
FIG. 1 is a schematic view of a framework of a conventional bus.
Figure 2:
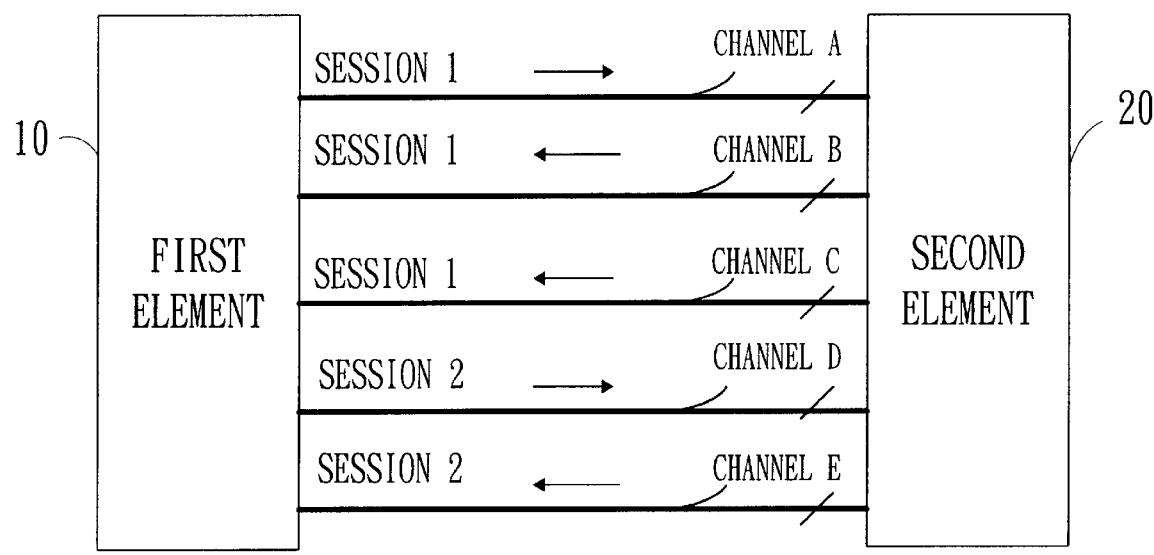
FIG. 2 is a schematic view of a framework of a channel transmission system in accordance with the present invention.

Referring now to FIG. 2, difference between the channels of the present invention and the conventional bus shown in FIG. 1 can be easily told. As shown, the first element 10 and the second element 20 are connected with a plurality of channels 30. Each channel 30, including a plurality of signal lines, is independently operated with respect to other channels 30. In practice, each channel 30 can be deemed as a localized data stream. Due to the nature of independent operation, the channels 30 combination in a system can then be properly adjusted in order to meet any practical requirement. As the example shown in FIG. 2, Channels A, B and C are assigned to session 1. On the other hand, channels D and E are assigned to session 2. Accurately, channel A is a unidirectional channel transmitting signals from the first element 10 to the second element 20, yet channels B and C are also unidirectional channels but transmitting signals from the second element 20 to the first element 10. That is, though every channel 30 in the present invention can have the same structure (i.e. including a plurality of signal lines), yet the transmission pattern (say, the transmission direction) for each channel 30 can be different but predetermined to meet the practical need of the system. Accordingly, it is the purpose of the present invention to provide a particular channel transmission model and a respective method suitable to the aforesaid channel framework.

In the following description, two embodiments are used to demonstrate the channel transmission protocol of the present invention, in which each channel 30 thereof includes a plurality of signal lines and is characterized in unidirectional transmission. The signal lines are mainly used to transmit address and data signals. Following are the first and the second preferred embodiments of the present invention introduced to demonstrate two types of channel transmission models in accordance with the present invention.

First Preferred Embodiment

Figure 4:
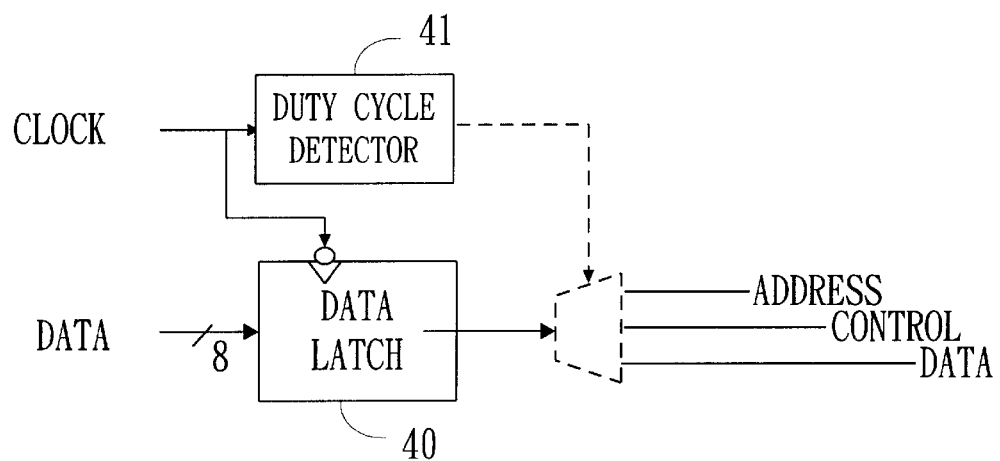
FIG. 4 is a block diagram showing the receiving end of the transmission model of FIG. 3.
Figure 5:
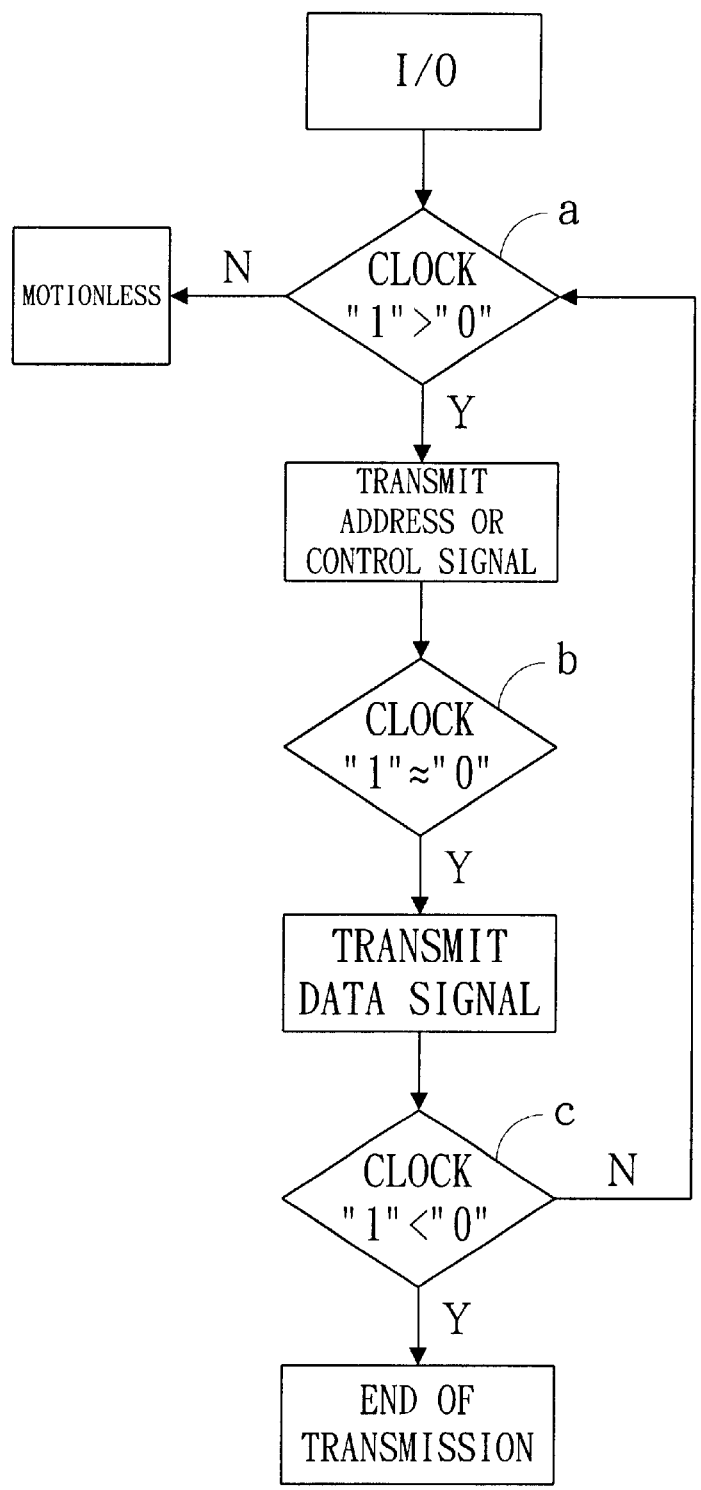
FIG. 5 is a flow chart of the first preferred embodiment in accordance with the present invention.

In the first channel transmission model, a signal line of the channel 30 is used as a clock for transmitting a start signal and an end signal. Rests of signal lines in the channel 30 are used as data lines for transmitting data signals. As shown in FIG. 4, the channel 30 of the first embodiment has 9 signal lines, and 8 of them are data lines. Of course, in practice, the number of signal lines as well as data lines can be more than that. Referring now to the time sequence illustrated in FIG. 3, the clock is not a traditional consistent square wave. By judging the duty cycle in each clock cycle, the respective data pattern transmitted by the data line can then be determined. Referring now to FIG. 5, the positive logic of the first embodiment can be demonstrated as follows.

(a) In a specific cycle that the duration for "1" is greater than that for "0" (for example, a duty cycle ratio "+":"−"=3:1), the transmission of data signals is started. Then, address or control signals are transmitted in the data line. As the example shown in FIG. 3, an address signal A followed by a control signal C is transmitted in the data line. Whether an address signal or a control signal is transmitted in the data line can be decided in accordance with the following criteria. They are:

1. The control signal always follows the address signal, as the example shown in FIG. 3.
2. If a certain cycle ratio, say 4:1 for example, exists between the address signal and the control signal, the signal with a longer cycle is an address signal and the signal with a shorter cycle is a control signal.

(b) In a specific cycle that the duration for "1" is about equal to that for "0" (for example, a duty cycle ratio of 1:1 with errors percentage within 25%), it can be known that data signals are transmitted in the data line. As the example shown in FIG. 3, the third to the seventh signals in the data line are data signals D.

(c) In a specific cycle that the duration for "1" is less than that for "0" (for example, a duty cycle ratio of 1:3), the transmission of data signals is ended.

According to the above criteria, the signals transmitted in the clock signal line of the present invention mainly include two major portions as follows.

1. Start of transmission and End of transmission.
2. Signal pattern of signals transmitted in the data line (such as data signal D, address signal A, or control signal C), and the signal sequence of signals in the data line.

Figure 3:
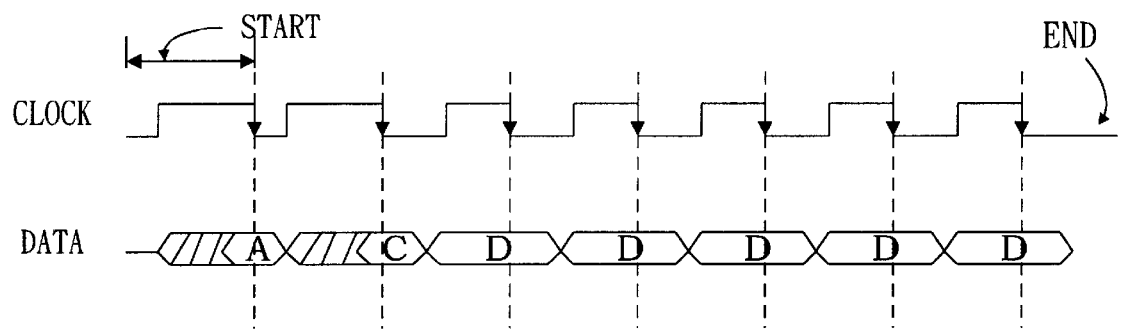
FIG. 3 shows a time sequence of a first preferred embodiment in accordance with the present invention.

In the example shown in FIG. 3, negative edges of the clock signals are used to trigger the capturing of data signals from the data line. During the first unsymmetrical cycle at the onset of the transmission, the data line is known to transmit an address signal A. During the following second unsymmetrical cycle, the data line transmits a control signal C. For rests of symmetrical cycles through the end of the transmission, data signals D are identified to flow in the data line.

FIG. 4 illustrates how a receiving end of the channel transmission model of the first embodiment to receive aforesaid clock signals as well as the data signals. The receiving end includes:

A data latch 40, for latching the signal (data signal D, address signal A, or control signal C) transmitted in the data line, triggered by falling edges of the clock signals, and performing the latching upon the respective signal in the data line while the clock signal line hits any negative edge; and A duty cycle detector 41, for detecting the duty cycle in each clock cycle.

Wherein the duty cycle defined by the duty cycle detector 41 will be used to determine whether the signals latched by the data latch 40 are address signals A, control signals C, or data signals D in accordance with the aforesaid definitions (the dashed line in the figure). The signals after previous identification will then be sent to the respective target element for further processing. Such the detection of the duty cycle and the determination of the signal pattern will be carried out till an end signal is detected.

In the aforesaid channel transmission model, the implicit meaning of the transmitted signals in the data signal line (i.e., the signal pattern) can be realized by judging the variation of the duty cycle in each clock cycle of the clock signals in the clock signal line. In this embodiment, the number of data lines and/or the criteria for determining the implicit meaning of signals in data lines with respect to various duty cycles can be properly adjusted to meet relevant practical requirements. Such an adjustment should be deemed as equivalent embodying of this channel transmission model.

Second Preferred Embodiment

Figure 6:
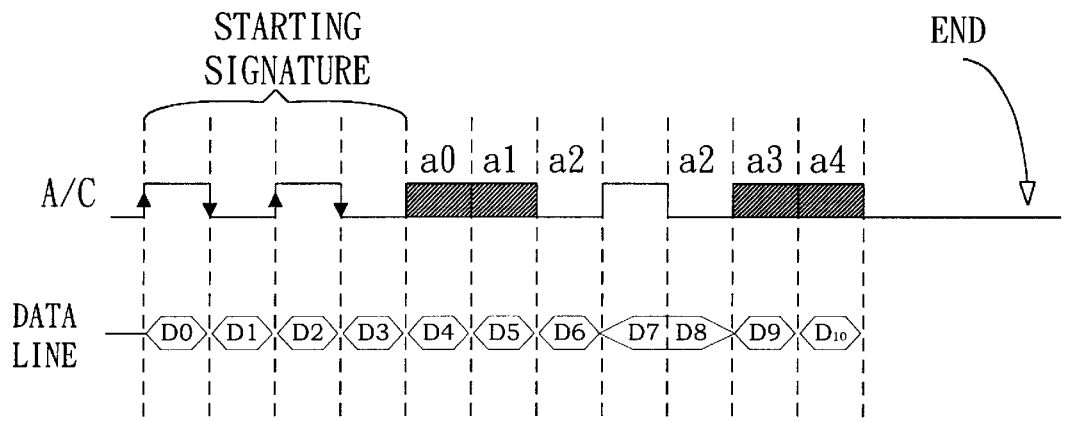
FIG. 6 shows a time sequence of a second preferred embodiment in accordance with the present invention.

Please refer to the time sequence illustrated in FIG. 6. In the second channel transmission model, an A/C line (Address/Control line) is used to define start of transmission, end of transmission, and transmission of address and/or control signals. Rests of signal lines in the same channel are used to transmit data signals.

The channel transmission model of the second embodiment is characterized in that the latching sequence can be determined by judging the signal variation in the A/C line and the bit switching of the transmitted address signal in the A/C line can be determined by judging the data signal variation in the data line. Similarly, in this channel transmission model, the number of the A/C line (1 in the embodiment) and the number of the data lines (8 in the embodiment) are both subject to any change without violating the embodying of this model.

In the embodiment shown in FIG. 6, the moment for latch triggering upon the data lines is determined according to the criterion of edge triggering. That is, the latch of the data lines will be triggered while a falling edge or a rising edge is met. The triggering with respect to both falling and rising edges in this embodiment is the major feature of this embodiment different to the first embodiment in which only the falling edge can trigger the latching.

Figure 8:
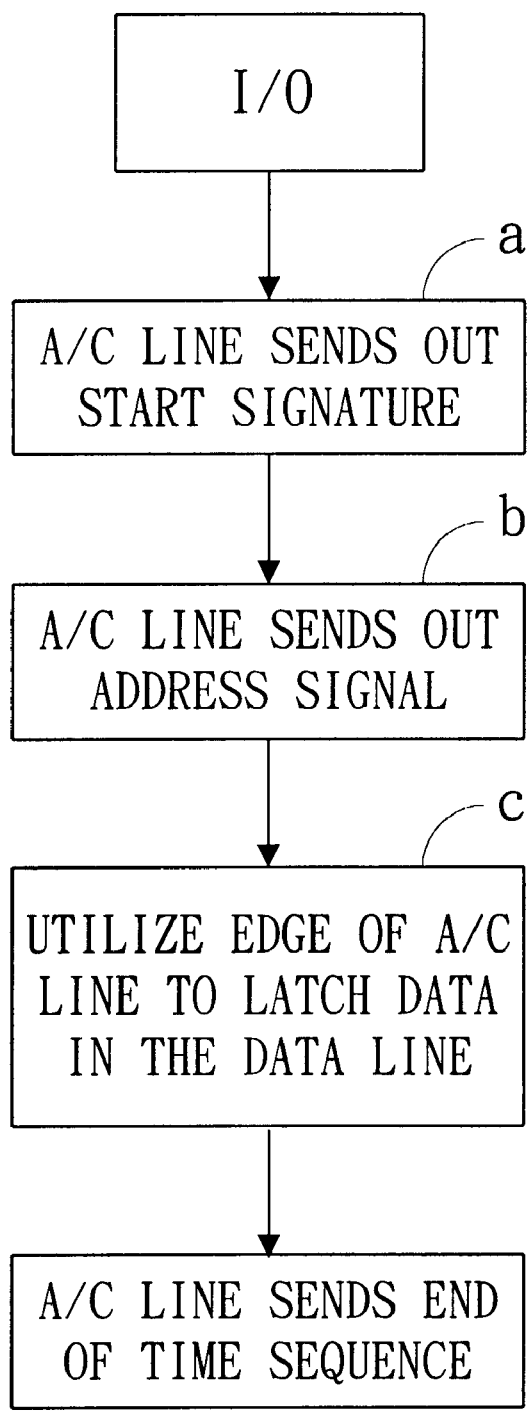
FIG. 8 is a flow chart of the second preferred embodiment in accordance with the present invention.

The A/C line uses a starting signature of "1010" to initiate the transmission sequence (as step a shown in FIG. 8). After the starting signature is transmitted in the A/C line, bits of the address signal (a0, a1, a2, a3, a4, ... in FIG. 6) are then transmitted (as step b shown in FIG. 8). In this embodiment, the data variation in the data line is used to define the switching of address bits. At the same time, while encountering the rising or falling edges of signals in A/C line, the bits D0, D1, D2 and D3 in the data line can be latched (as step c shown in FIG. 8). By applying the same time sequence, other signals in rest of data lines in the same channel can be latched in order as well.

It is interesting to find a special situation in FIG. 6. That is, when an identical signal is transmitted in two consecutive cycles as D7 and D8 in FIG. 6, the A/C just duplicates the output (as the second a2 shown in FIG. 6) to meet the situation.

Figure 7:
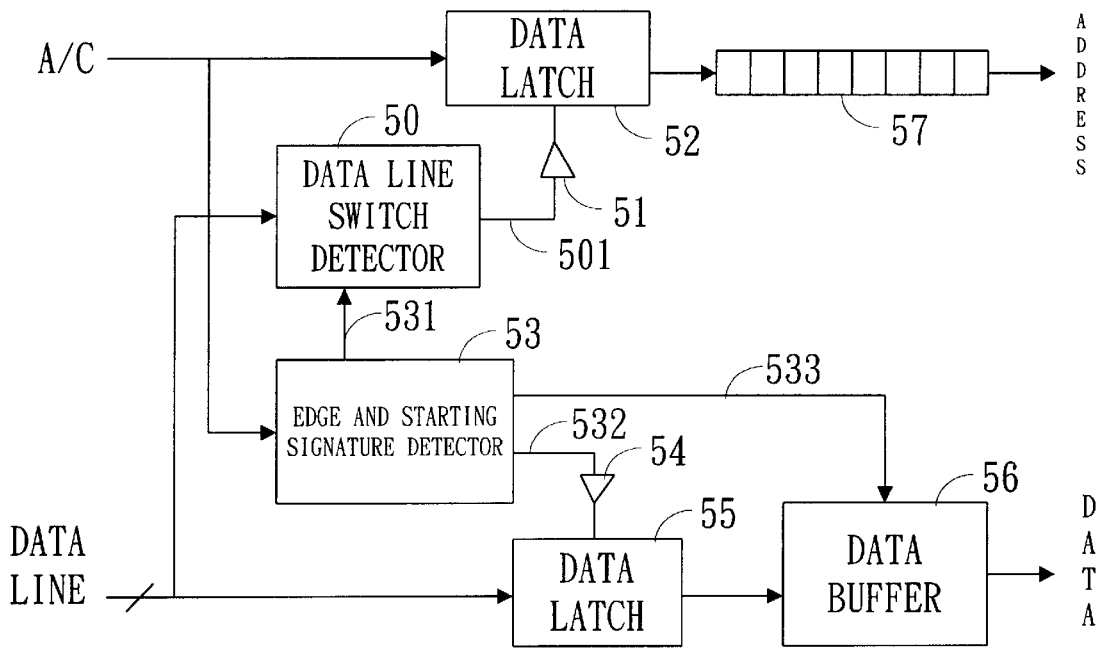
FIG. 7 is a block diagram showing the receiving end of the transmission model of FIG. 6.

Referring now to FIG. 7, a block diagram is shown to explain how the receiving end of the channel transmission model interprets the aforesaid time sequence. As stated previously, three situations need to be detected. That is:

1. Start of transmission (or end of transmission).
2. Edges of signals in the A/C line for signal latching upon data lines; including both the rising and the falling edges.
3. Variation of transmitted signal itself in the data line for defining the bit variation of signals in the A/C line.

As the structure shown in FIG. 7, the embodiment includes:

A data lines switch detector 50, for detecting and determining the variation of signals in the data lines, generating switching control 501 while a variation is detected, and the switching control 501 being sent to a data latch 52 via a delay buffer 51;

An edge and starting signature detector 53, having the following reactions:

1. To detect the starting signature in the A/C line, for generating an address control 531 to the data lines switch detector 50 to indicate the beginning of effective data transmitted in the data lines;
2. To detect the appearance of edges in the A/C line, for generating a required edge-triggering control 532, the control 532 being forwarded to a data latch 55 via a delay buffer 54 for controlling the data latch 55 to latch the signals transmitted in the data lines; and
3. To generate a starting control 533, for determining the real effective data in a data buffer 56;

A serial buffer 57, for sending out effective address signals by collecting the latched data received from the data latch 52; and A data buffer 56, controlled by the starting control 533 for determining the effective data in the data buffer 56.

In this embodiment, after a starting signature of "1010" is detected in the A/C line by the edge and starting signature detector, the transmission of effective data in the data lines is then started. Consequently, the edge and starting signature detector 53 can also detect the appearance of edges in the A/C line for generating a respective edge-triggering control 532. After the delay buffer 54 delays the edge-triggering control 532 for a predetermined duration, the edge-triggering control 532 is further used to trigger the data latch 55 for latching the signals in the data lines. The data latched by the data latch 55 will be then forwarded to the data buffer 56. The starting control 533 generated by the edge and starting signature detector 53 will then be used to determine the forwarding of the real effective data collected in the data buffer 56. On the other hand, the A/C line will send out an address signal at the same time. Due to the single signal line assigned to the A/C line, the address signals are generated as a sequence of individual bits. The edge and starting signature detector 53 will forward the address control 531 to the data lines switch detector 50 for ordering the data lines switch detector 50 to receive sequentially every bit of address signals. When a signal variation in the data lines is met, a switching control 501 is generated and forwarded to the data latch 52 for receiving the current bits in the A/C line. These bits will be collected by the serial buffer 57 and then be forwarding to a next stop after an effective address signal is formed.

In this channel transmission model, the A/C line and the data lines are inter-referred for data latching. Except that the A/C line is in charge of indicating the start or the end of the sequence, the signal latching on the data lines is triggered upon hitting edges of signals transmitted in the A/C line, and on the other hand the data variation in the data lines is further applied to carry out the latching of the address signal bits transmitted in the A/C line. Similarly, specific requirements applied to this preferred embodiment are not specifically used to restrict the framework of this channel transmission model.

As stated, the framework and the respective method for inter-element channel transmission in accordance with the present invention are capable of transmitting address/data signals through a plurality of channels defined above. The data transmission can be optimized according to the practical requirements of data flow. By applying the present invention, the disadvantages of conventional buses are obviously improved.

While the present invention has been particularly shown and described with reference to preferred embodiments, it will be understood by those skilled in the art that various changes in form and detail may be without departing from the spirit and scope of the present invention.

We claim:

1. A channel transmission framework between elements, comprising:

a data latch, for latching signals (including data, address and control signals) transmitted in a data line while triggered by a negative edge of a clock signal; and a duty cycle detector, for detecting a respective duty cycle of each cycle of said clock signal;

said duty cycle and said signals of said data latch being used to determine corresponding signal patterns for realizing said respective data, address and control signals for further processing in a receiving element, and said detecting of said duty cycle detector ended while a condition of transmission end is met.

2. A channel transmission framework between elements, comprising:

a data lines switch detector, for detecting and determining signal variation in data lines, and generating a switching control to a data latch while detecting any variation;

an edge and starting signature detector,
to detect a starting signature in an address control line for generating an address control to the data lines switch detector for ensuring a start of effective data in the data lines;
to detect appearance of edges in the address control line for generating a required edge triggering control to the data latch via a delay buffer, for controlling the data latch to latch the signals in the data lines; and
to generate a starting control for determining the effective data in the data buffer;

a serial buffer, for collecting the effective address data from the data latch and then sending out the effective address data; and a data buffer, controlled by the starting control for determining the effective data in the data buffer.

* * * * *